June 10, 1930. T. E. RICE 1,763,480
COTTON PICKER
Filed March 3, 1928 2 Sheets-Sheet 1

Thomas E. Rice
INVENTOR

BY Victor J. Evans
ATTORNEY

WITNESS:

June 10, 1930. T. E. RICE 1,763,480
COTTON PICKER
Filed March 3, 1928 2 Sheets-Sheet 2
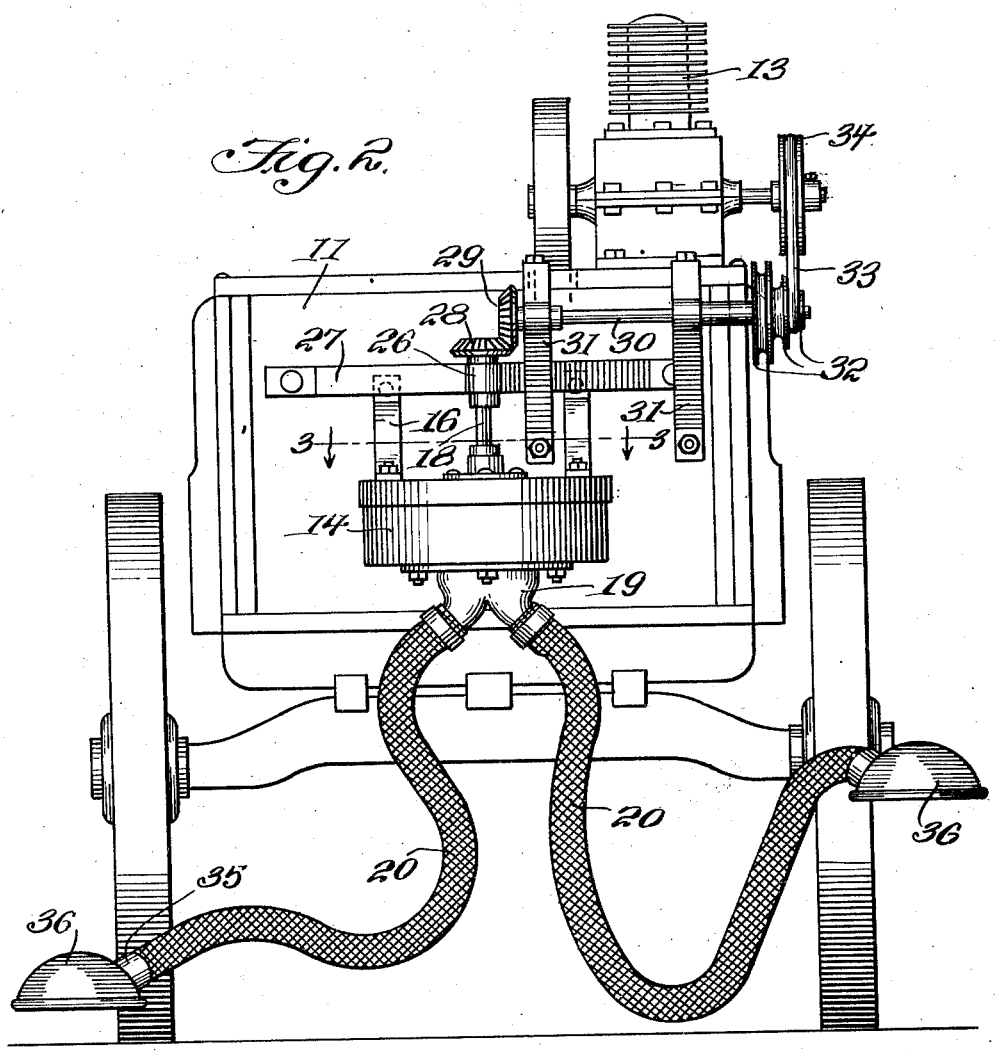
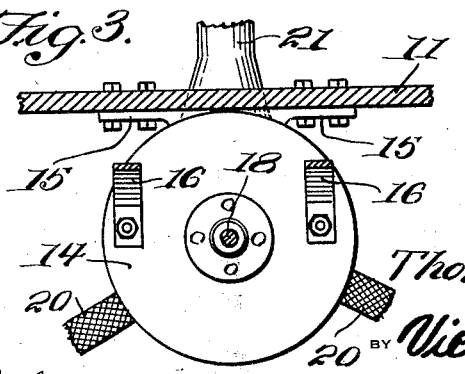
Thomas E. Rice
INVENTOR
BY Victor J. Evans
ATTORNEY
WITNESS:

Patented June 10, 1930

1,763,480

UNITED STATES PATENT OFFICE

THOMAS E. RICE, OF DES MOINES, IOWA

COTTON PICKER

Application filed March 3, 1928. Serial No. 258,869.

This invention relates to cotton picking devices and has for an object the provision of a pneumatic cotton picker which is simple in construction, reliable and efficient in use, and may be mounted upon an ordinary farm wagon or other vehicle to provide a cheap cotton picker, and one which may be operated at a low cost.

Another object of the invention is the provision of a cotton picker which may be used without damage to the plants, so that the field may be gone over any desired number of times and the cotton picked at just the desired degree of ripeness, with the result that the first, as well as the succeeding growths of cotton may be successfully picked.

Another object of the invention is the provision of a cotton picker which permits of the first growth of cotton being picked without waiting for the second growth to ripen, the first growth thus being picked before it becomes damaged.

Another object of the invention is the provision of means for picking first growth cotton without gathering dirt or other extraneous matter with the cotton as usually occurs due to the proximity of first growth cotton to the ground.

With the above and other objects in view, the invention further includes the following novel features and details of construction, to be hereinafter more fully described, illustrated in the accompanying drawings and pointed out in the appended claim.

In the drawings:—

Figure 2 is a rear elevation of the same.

Figure 3 is a detail sectional view on the line 3—3 of Figure 2.

Figures 1, 4:
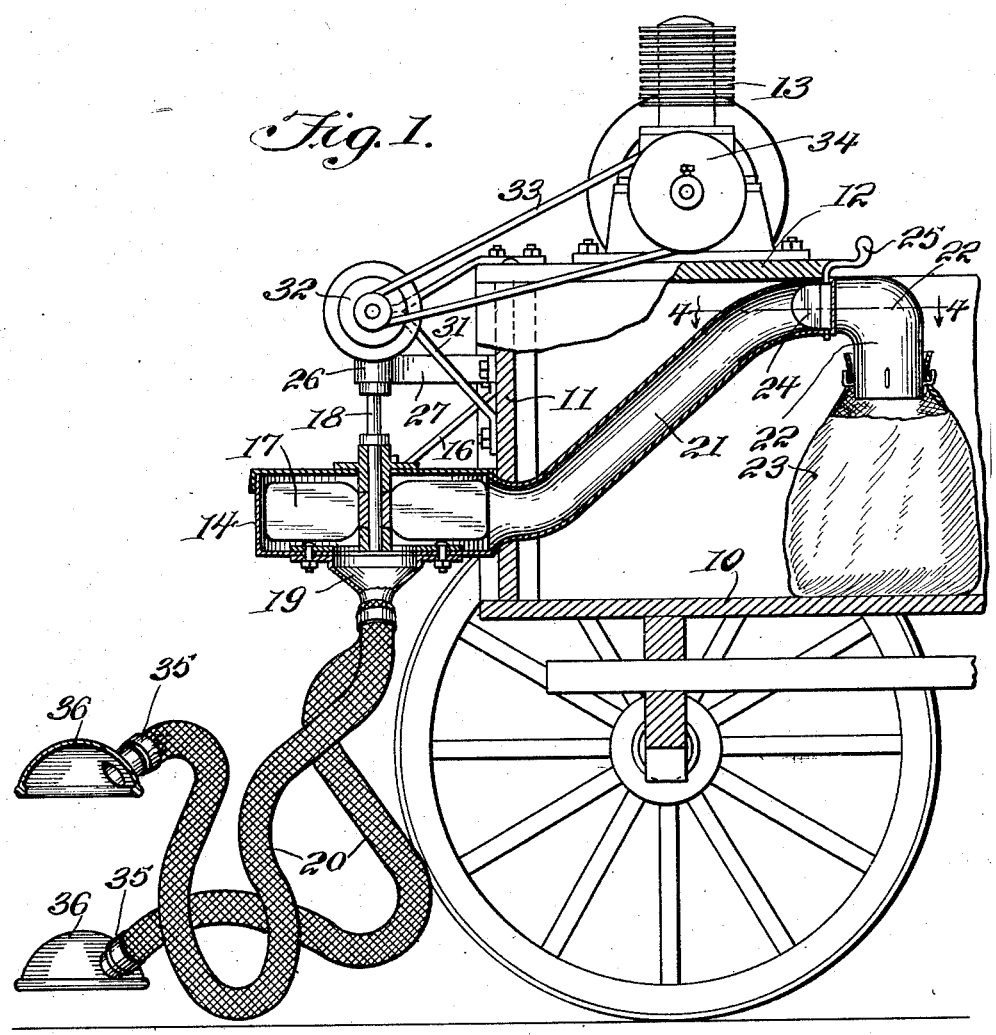
Figure 1 is a vertical sectional view illustrating the invention applied to an ordinary farm wagon.
Figure 4 is a section on the line 4—4 of Figure 1.

Referring to the drawings in detail wherein like characters of reference denote corresponding parts, the invention is shown as applied to an ordinary farm wagon, the box of which is indicated at 10 and the tail gate at 11. The tail gate may or may not be removable, and is of the removable type, will be held in place by means of a platform 12 which is secured across the top of the box 10 and serves as a platform for an engine 13, which is used to operate the cotton picker.

The invention includes a suction fan whose housing 14 is secured to the tail gate by means of a support 15 and braces 16, the support and braces being bolted to the tail gate 11. It is of course apparent that the usual tail gate of the wagon may be removed and the fan housing 14 permanently attached to a substitute tail gate. The blades 17 of the suction fan are mounted upon a shaft 18 and the intake opening of the housing is in communication with an intake manifold 19 to which is attached a number of flexible suction tubes 20. Two tubes are shown but it is of course obvious that any number may be employed.

Extending from the fan housing 14 through an opening provided in the tail gate 11 is a discharge conduit 21. This conduit extends inwardly and upwardly and is provided with branches 22, which extend downwardly and which have removably secured at their discharge ends, sacks 23 which receive the picked cotton. A valve 24 is located at the entrance of the branches 22 and is operated by a handle 25 to direct the cotton into either of the branches and into either of the sacks 23.

The shaft 18 is mounted in a bearing 26 which is carried by a bracket 27 secured to the tail gate 11. This bearing may of course be of the anti-friction type if desired as may also be the bearings for the fan blades 17. Secured to the shaft 18 is a beveled pinion 28 which is driven by a beveled pinion 29 secured to a shaft 30, the latter being mounted in suitable bearings carried by brackets 31 which are also secured to the tail gate 11. These last referred to bearings may also if desired be of the anti-friction type. Secured to the shaft 30 is a plurality of grooved pulleys 32 of different diameters and these pulleys are adapted to be driven by means of a belt 33 from a pulley 34 which is secured to the shaft of the engine 13. The pulley 34 may be adjusted longitudinally of the engine shaft and the belt 33 may be engaged with any one of the pulleys 32 to regulate the suction of the fan, so that the suction through the tubes 20 may be regulated in accordance with the degree of ripeness of the cotton.

Swiveled upon the outer ends of the suction tubes 20 as shown at 35 are collector cups 36, and when the device is in use, these cups are adapted to be placed over the cotton so that the bolls will be drawn into the cups through the tubes and will be discharged through the conduit 21 into one of the bags 23. When one of the bags 23 has been filled, the valves 24 may be adjusted so as to direct the cotton into the unfilled bag while the filled bag is being emptied and replaced in position for use.

By swivelling the collector cups to the suction tubes, the cups may be positioned over the top, at the sides or beneath the bolls. This is especially useful in picking first growth cotton as the cups may be positioned between the boll and the ground so as to prevent dirt or other extraneous matter being sucked in with the cotton.

The invention is susceptible of various changes in its form, proportions and minor details of construction and the right is herein reserved to make such changes as properly fall within the scope of the appended claim.

Having described the invention what is claimed is:—

A cotton picker comprising in combination with a wagon box, a suction fan secured to the vertical end wall of the box, a platform upon top of the box, a motor mounted upon the platform, means operatively associating the motor and fan to drive the latter, a receiving sack disposed within the box, a conveyor conduit extending from the fan casing through the end of the wagon box to direct the cotton to the receiving sack, a suction tube extending from the fan casing, and a collector cup at the outer end of the tube.

In testimony whereof I affix my signature.

THOMAS E. RICE.